US008529116B2

(12) United States Patent
Tsai et al.

(10) Patent No.: US 8,529,116 B2
(45) Date of Patent: Sep. 10, 2013

(54) LIGHT GUIDE PLATE AND LIGHT SOURCE MODULE

(75) Inventors: Han-Wen Tsai, Hsin-Chu (TW); Chih-Chieh Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 282 days.

(21) Appl. No.: 13/074,007

(22) Filed: Mar. 29, 2011

(65) Prior Publication Data

US 2011/0241573 A1 Oct. 6, 2011

(30) Foreign Application Priority Data

Apr. 6, 2010 (TW) .............................. 99110569 A

(51) Int. Cl.
*F21V 7/04* (2006.01)

(52) U.S. Cl.
USPC ........... 362/620; 362/626; 362/619; 362/625; 362/339; 315/39

(58) Field of Classification Search
USPC ................... 362/97, 561, 614, 615, 625, 628; 315/244, 246, 248, 276, 344, 112–119, 289, 315/39
See application file for complete search history.

(56) References Cited

U.S. PATENT DOCUMENTS

| | | | |
|---|---|---|---|
| 6,454,452 B1 | 9/2002 | Sasagawa et al. | |
| 6,612,722 B2 | 9/2003 | Ryu et al. | |
| 6,834,973 B2 | 12/2004 | Ohkawa | |
| 2007/0047258 A1* | 3/2007 | Yao et al. | 362/615 |
| 2008/0285309 A1* | 11/2008 | Fang et al. | 362/620 |
| 2009/0091927 A1* | 4/2009 | Iwasaki | 362/217.05 |
| 2009/0097274 A1* | 4/2009 | Shinohara et al. | 362/619 |
| 2009/0129056 A1* | 5/2009 | Taya et al. | 362/97.1 |
| 2009/0147537 A1* | 6/2009 | Iwasaki | 362/620 |

FOREIGN PATENT DOCUMENTS

| | | |
|---|---|---|
| CN | 1908764 | 2/2007 |
| CN | 101393298 | 3/2009 |
| CN | 101634726 | 1/2010 |
| TW | 463957 | 11/2001 |

(Continued)

OTHER PUBLICATIONS

"First Office Action of China Counterpart Application", issued on Apr. 24, 2012, p. 1-p. 10, with English translation thereof, in which the listed references were cited.

(Continued)

*Primary Examiner* — Shawki Ismail
*Assistant Examiner* — Christopher Lo
(74) *Attorney, Agent, or Firm* — Jianq Chyun IP Office

(57) ABSTRACT

A light guide plate includes a first surface, a second surface, at least a light incident surface, and a plurality of groove sets. The second surface is opposite to the first surface. The light incident surface connects the first surface and the second surface. The groove sets are separately disposed on the second surface. Each of the groove sets includes a plurality of curved grooves. Each of the curved grooves has a curved inclined reflective surface and a curved light-back-surface. The curved inclined reflective surface is inclined with respect to the first surface. The curved grooves of each of the groove sets curve towards a same curving direction. The curved inclined reflective surface of one of two curved grooves is connected to the curved light-back-surface of the other one of the two curved grooves. A backlight module is also provided.

22 Claims, 9 Drawing Sheets

(56) References Cited

FOREIGN PATENT DOCUMENTS

| | | |
|---|---|---|
| TW | 200604607 | 2/2006 |
| TW | I282021 | 6/2007 |
| TW | 200801615 | 1/2008 |
| TW | I296352 | 5/2008 |
| TW | 200931066 | 7/2009 |

OTHER PUBLICATIONS

"Office Action of Taiwan Counterpart Application" with English translation thereof, issued on May 6, 2013, p. 1-p. 12, in which the listed references were cited.

* cited by examiner

LIGHT GUIDE PLATE AND LIGHT SOURCE MODULE

CROSS-REFERENCE TO RELATED APPLICATION

This application claims the priority benefit of Taiwan application serial no. 99110569, filed on Apr. 6, 2010. The entirety of the above-mentioned patent application is hereby incorporated by reference herein and made a part of this specification.

BACKGROUND OF THE INVENTION

1. Field of the Invention

The invention is generally related to an optical device and a light source, and more particularly, to a light guide plate and a light source module.

2. Description of Related Art

A conventional side incident type light source module employs a light guide plate to guide a light beam emitted by a light emitting device disposed besides the light guide plate, to a front surface of the light guide plate, so that a planar light source is formed. Generally, after the light beam emitted by the light emitting device is guided from a side surface of the light guide plate into the light guide plate, the light beam is totally reflected continually by the upper and lower surfaces of the light guide plate, and thereby the light beam is restricted within the light guide plate. However, microstructures disposed on a surface of the light guide plate may destroy the total reflection effect, such that the light beam is incident upon the upper surface with an incident angle of less than a critical angle, and the light beam transmits through the upper surface.

Although the microstructures may destroy the total reflection, a majority of the light beams is obliquely emitted out of the upper surface due to the microstructures, instead of being directly forward emitted out of the upper surface. In order to promote forward emission of the light beams, a prism sheet is typically disposed on the upper surface of the light guide plate of the conventional light source module, so as to direct a light path of the light beams towards one emitting direction approaching a forward and frontal direction. Moreover, the prism sheet totally reflects a portion of light beams having particular advancing angles back towards the light guide plate to reuse the light beams. However, a light loss occurs when the light beams pass through a prism sheet and when the light beams are totally reflected back towards the light guide plate, thereby lowering a brightness provided by the light source module.

Taiwan Patent No. I282021 disclosed a light guide plate with microstructures, wherein the microstructures are arranged repetitiously on a bottom surface of the light guide plate. Taiwan Patent No. I296352 disclosed a light guide plate having multi-layered ring-shaped structures. The light guide plate has a first ring-shaped microstructure and a second ring-shaped microstructure. The first and second ring-shaped microstructures have different bottom surface widths. The microstructures may be disposed on a lower surface of the light guide plate. On the other hand, U.S. Pat. No. 6,454,452 disclosed a light guide plate with a bottom surface having wedge-shaped grooves, wherein an included angle of the grooves between an inclined surface and the bottom surface may be 43°, 45°, and 47°. Taiwan Patent No. M321111 disclosed a light guide plate having regularly arranged microstructures. U.S. Pat. No. 6,612,722 disclosed a light guide plate having microstructures. Moreover, U.S. Pat. No. 6,834,973 disclosed a light guide plate with a bottom surface having micro-reflector structures.

SUMMARY OF THE INVENTION

The invention provides a light guide plate capable of lowering a light loss.

The invention provides a light source module having a higher optical efficiency.

Other objects and advantages of the invention may be further illustrated by the technical features broadly embodied and described as follows.

In order to achieve at least one of the above advantages or other advantages, an embodiment of the invention provides a light guide plate including a first surface, a second surface, at least a light incident surface, and a plurality of groove sets. The second surface is opposite to the first surface. The light incident surface is connecting with the first surface and the second surface. The groove sets are separately disposed on the second surface. Each of the groove sets includes a plurality of curved grooves. Each of the curved grooves has a curved inclined reflective surface and a curved light-back-surface connected to each other. Moreover, the curved inclined reflective surface inclines with respect to the first surface. The curved grooves of each of the groove sets curve towards a same curving direction, and the curved inclined reflective surface of one of two adjacent curved grooves is connected to the curved light-back-surface of the other one of the two adjacent curved grooves.

Another embodiment of the invention provides a light source module, including the above-described light guide plate and at least a light emitting device. The light emitting device is disposed besides the light incident surface, and capable of emitting a light beam. Moreover, the light beam is capable of entering the light guide plate through the light incident surface, and the light beam is capable of transmitting out of the light guide plate through the first surface. The curved inclined reflective surface is capable of reflecting the light beam from the light incident surface to the first surface.

According to an embodiment of the invention, at least one of the first surface and the second surface other than the groove sets is a sandblasted surface.

In summary, embodiments of the invention may have at least one of the following advantages. In the light guide plate and the light source module according to embodiments of the invention, curved inclined reflective surfaces are disposed on the second surface, and the curved inclined reflective surfaces may reflect a light beam towards a predetermined direction. Therefore, an amount of optical films employed above the first surface of the light guide plate may be reduced, or the use of optical films may be completely avoided, thereby lowering the light loss and reducing costs.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
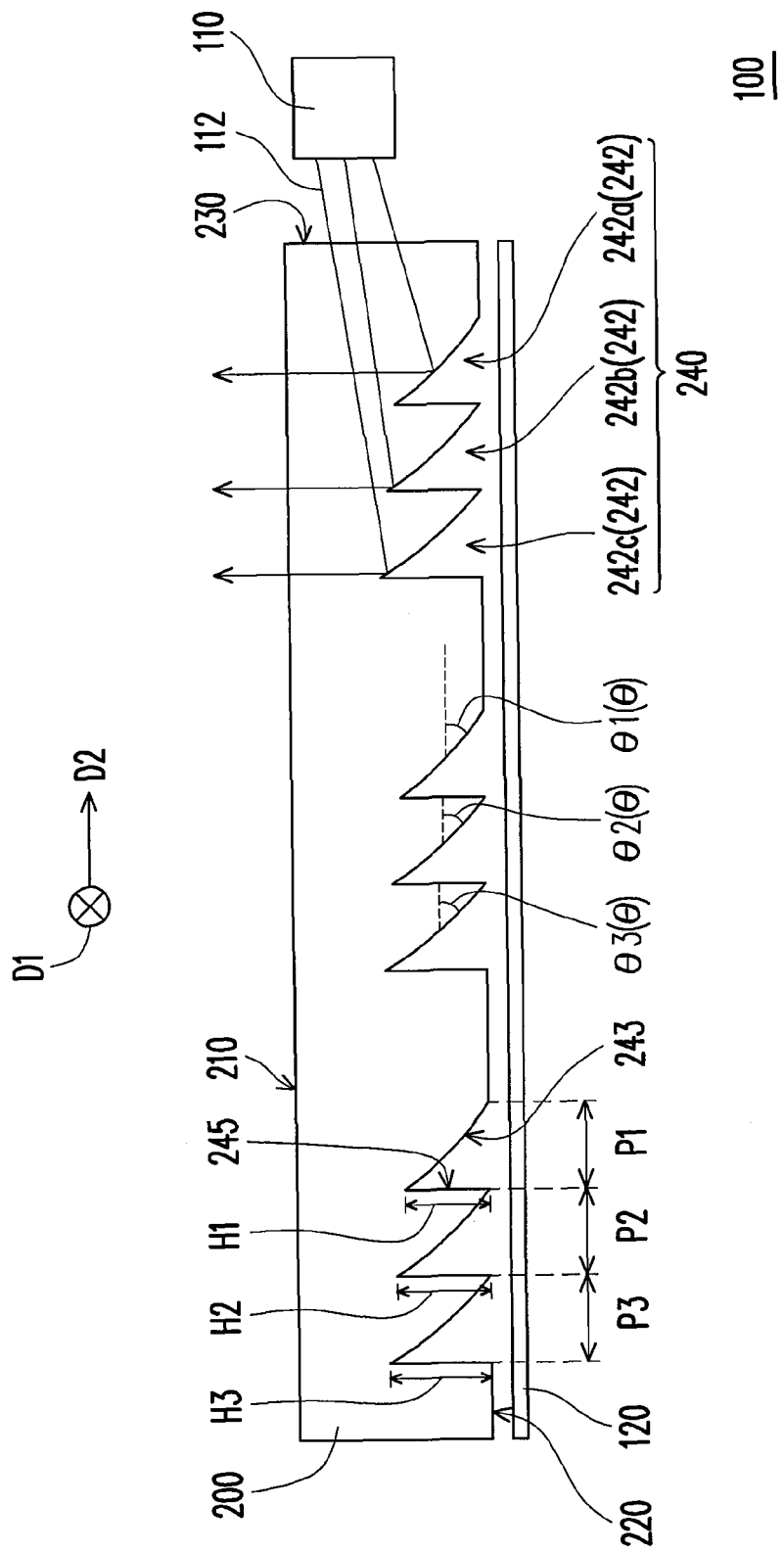
FIG. 1A is a schematic cross-sectional view of a light source module in accordance with an embodiment of the invention.
Figure 1B:
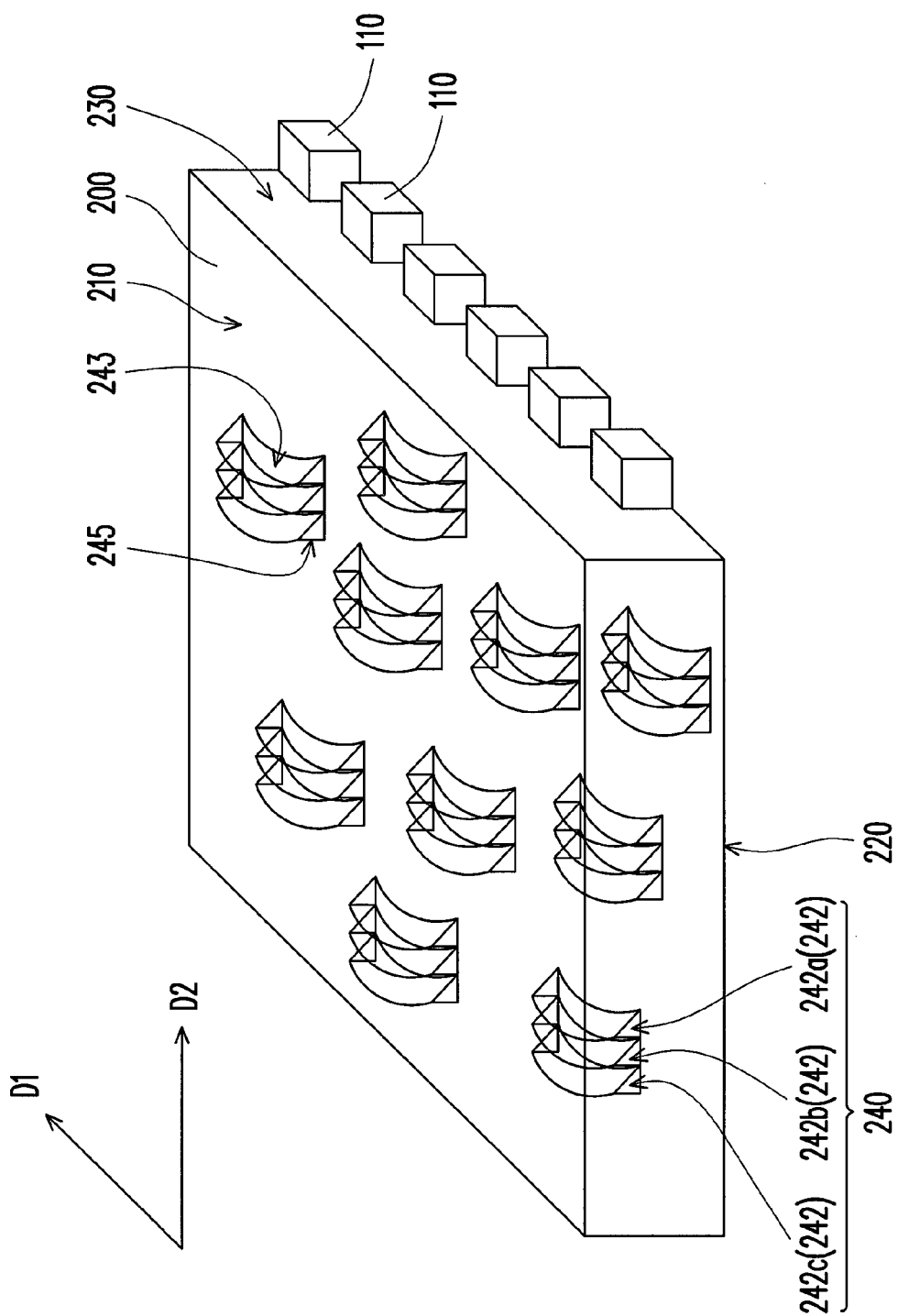
FIG. 1B is a perspective schematic view of the light guide plate and the light emitting devices depicted in FIG. 1A.
Figure 1C:
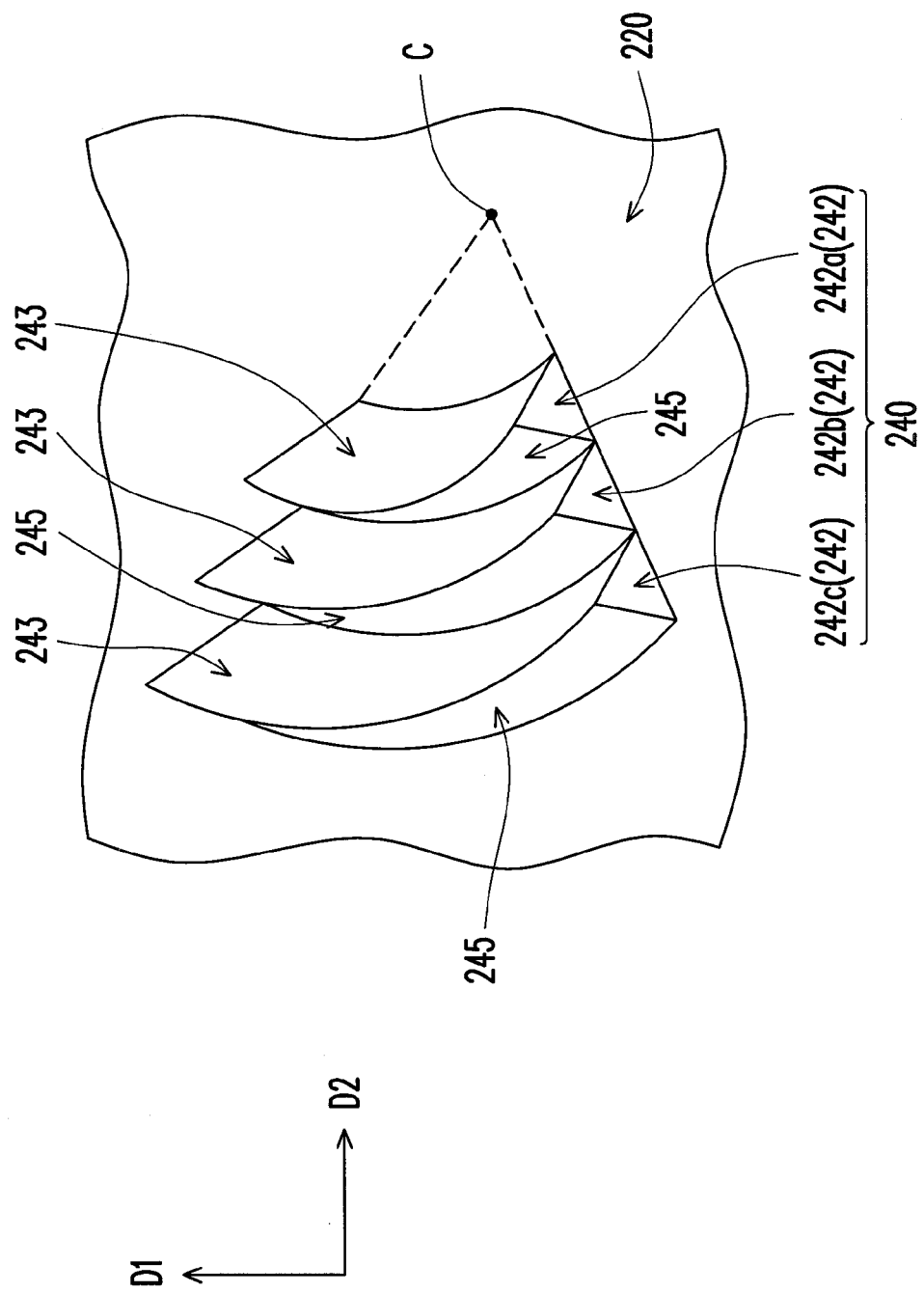
FIG. 1C is an enlarged view of a portion of the second surface depicted in FIG. 1A.

Referring to FIGS. 1A-1C, in the embodiment of the invention, a light source module 100 includes a light guide plate 200 and at least a light emitting device 110 (e.g., a plurality of light emitting devices 110 are exemplarily depicted in FIG. 1B). The light guide plate 200 includes a first surface 210, a second surface 220, at least a light incident surface 230 (e.g., one light incident surface 230 is exemplarily depicted in FIGS. 1A and 1B), and a plurality of groove sets 240. The second surface 220 is opposite to the first surface 210. The light incident surface 230 is connecting with the first surface 210 and the second surface 220. In the embodiment, the first surface 210 is substantially parallel to the second surface 220, and the light incident surface 230 is substantially perpendicular to the first surface 210 and the second surface 220, although the invention is not limited thereto.

The groove sets 240 are separately disposed on the second surface 220. Each of the groove sets 240 includes a plurality of curved grooves 242 (e.g., three curved grooves 242a, 242b, and 242c are exemplarily depicted in FIG. 1A). Each of the curved grooves 242 has a curved inclined reflective surface 243 and a curved light-back-surface 245 connected to each other. Moreover, the curved inclined reflective surfaces 243 incline with respect to the first surface 210. In the embodiment, the curved inclined reflective surface 243 and the curved light-back-surface 245 belong to a surface of the light guide plate 200. The curved grooves 242 of each of the groove sets 240 curve towards a same curving direction, and the curved inclined reflective surface 243 of one of two adjacent curved grooves 242 is connected to the curved light-back-surface 245 of the other one of the two adjacent curved grooves 242. For example, the curved inclined reflective surface 243 of the curved groove 242b is connected to the curved light-back-surface 245 of the curved groove 242a.

The light emitting devices 110 are disposed besides the light incident surface 230 and are capable of emitting a light beam 112. In the embodiment, each of the light emitting devices 110 is a light-emitting diode (LED), for example. However, in other embodiments, fluorescent lamps or other suitable light emitting devices may be used to replace the LEDs 110. The light beam 112 is capable of entering the light guide plate 200 through the light incident surface 230, and the light beam 112 is capable of transmitting out of the light guide plate 200 through the first surface 210. Moreover, the curved inclined reflective surface 243 is capable of reflecting the light beam 112 from the light incident surface 230 to the first surface 210.

In the light guide plate 200 and the light source module 100 according to the embodiment, the curved inclined reflective surface 243 disposed on the second surface 220 may reflect the light beam 112 towards a predetermined direction. Therefore, an amount of optical films employed above the first surface 210 of the light guide plate 200 may be reduced (e.g., by using a lens array film), or the use of optical films may be completely avoided, thereby lowering a light loss and reducing costs. For example, when an inclination degree of the curved inclined reflective surface 243 has been suitably designed, the curved inclined reflective surface 243 may emit the light beam 112 out of the light guide plate 200 in a substantially perpendicular direction to the first surface 210, such that the prism sheet may not be disposed above the first surface to modify the transmission direction of the light beam 112, thereby reducing the light loss and costs.

In the embodiment of the invention, each of the curved grooves 242 is an arc groove, and the curved inclined reflective surface 243 of the arc groove is disposed between the curved light-back-surface 245 and the light incident surface 230. In the embodiment, the curved inclined reflective surface 243 of the curved groove 242 is disposed between the curved light-back-surface 245 and a curvature center C of the curved groove 242. Moreover, in the embodiment, the curvature centers C of the curved grooves 242a, 242b, and 242c in each of the groove sets 240 are substantially overlapping with each other. In other words, the curved grooves 242 are concentric arc grooves.

Furthermore, in the embodiment, the curved grooves 242, the curved inclined reflective surfaces 243, and the curved light-back-surface 245 curve in a direction substantially parallel to the first surface 210. Accordingly, the light beam 112 reflected by the curved inclined reflective surfaces 243 may be spread in a direction parallel to the first surface 210, and not restricted by a particular direction. Moreover, in the embodiment, a cross-sectional outline of the curved inclined reflective surfaces 243 sliced along a direction perpendicular to the first surface 210 has a curved shape (e.g., as shown in FIG. 1A). Accordingly, the light beam 112 may be spread in a plane perpendicular to the first surface 210, and not be restricted by a particular direction. Since the curved inclined reflective surfaces 243 may spread a light beam, the light beam 112 emitted from the first surface 210 may have a smooth light distribution, and the light beam 112 having the smooth light distribution may be suitable for a wide viewing angle need, and consequently may be adapted as a backlight source of a liquid crystal display panel, or other illumination applications requiring a smooth light distribution or a wide viewing angle. However, in other embodiments of the invention, the cross-sectional outline of the curved inclined reflective surfaces 243 sliced along a direction perpendicular to the first surface 210 may also have a straight linear shape.

In the embodiment, the average inclination angles θ of the curved inclined reflective surfaces 243 of the curved grooves 242 in each of the groove sets 240 with respect to the first surface 210 are substantially different from each other. For example, the average inclination angles θ1, θ2, and θ3 of the curved inclined reflective surface 243 of the curved grooves 242a, 242b, and 242c are not equal to each other. Since the cross-sectional outline of the curved inclined reflective surfaces 243 sliced along a direction perpendicular to the first surface 210 has a curved shape (e.g., as shown in the curved cross-sectional outline depicted in FIG. 1A), therefore inclination angles formed by tangential directions at different points of the cross-sectional outline with respect to the first surface 210 may also be dissimilar. An average inclination angle is defined by adding the inclination angles formed by the tangential directions at each point of the cross-sectional outline with respect to the first surface 210, then dividing by a number of points on the cross-sectional outline. Since the average inclination angles θ1, θ2, and θ3 are not equal to each other, a light path of the light beam 112 reflected by the curved inclined reflective surfaces 243 of the curved grooves 242a, 242b, and 242c is also spread across a plane perpendicular to the first surface 210. Accordingly, the emitted light beam 112 has a smooth light distribution, and the light beam 112 having the smooth light distribution may be suitable for a wide viewing angle need.

In the embodiment, a difference value between any two average inclination angles θ, close to each other in magnitude, of the curved inclined reflective surfaces 243 of the curved grooves 242 of each of the groove sets 240 with respect to the first surface 210 is smaller than or equal to 10°. For example, the magnitudes of the average inclination angles θ1, θ2, and θ3 are 44°, 50°, and 56°. Therefore, a difference value between 44° and 50° is smaller than or equal to 10°, and a difference value between 50° and 56° is smaller than or equal to 10°. Furthermore, the invention does not restrict the ordering of the magnitudes of the average inclination angles θ1, θ2, and θ3 to being small to large. The ordering may also be from large to small or a random arrangement.

In the embodiment, the average inclination angle θ of each of the curved inclined reflective surfaces 243 is larger than or equal to 30° and smaller than or equal to 60°. Accordingly, the light beam 112 may be directed towards a direction approximately perpendicular to the first surface 210. In the embodiment, a material of the light guide plate 200 includes plastic (e.g., acrylic). However, in other embodiments of the invention, the material of the light guide plate 200 may also include glass, other plastics, or other suitable transparent materials. Moreover, in the embodiment, the curved light-back-surface 245 may be substantially perpendicular to the first surface 210, approximately perpendicular to the first surface 210, or inclined with respect to the first surface 210.

The radial widths P1, P2, and P3 expanded from the curvature center C of the curved grooves 242a, 242b, and 242c of each of the groove sets 240 may be substantially equal, partially equal, or different from each other. Moreover, the depths H1, H2, and H3 of the curved grooves 242a, 242b, and 242c of each of the groove sets 240 may be substantially equal, partially equal, or different from each other. The invention does not limit each of the groove sets 240 to include three curved grooves 242. In other embodiments, each of the groove sets 240 may also include two curved grooves 242 or four or more curved grooves 242.

Additionally, in the embodiment, a width of each of the groove sets 240 is lager than or equal to 10 μm and smaller than or equal to 100 μn. Further, a distribution density of the groove sets 240 on the second surface 220 may be designed such that the emitted light beam 112 from the first surface 210 is uniformly distributed. For example, the distribution density of the groove sets 240 may progressively increase from near the light incident surface 230 towards away from the light incident surface 230.

In the embodiment of the invention, the light source module 100 further includes a reflective unit 120 disposed on the second surface 220. The reflective unit 120 is a reflective plate capable of reflecting the light beam 112, for example. However, in other embodiments, the light source module 100 may omit the reflective unit 120.

Figure 2:
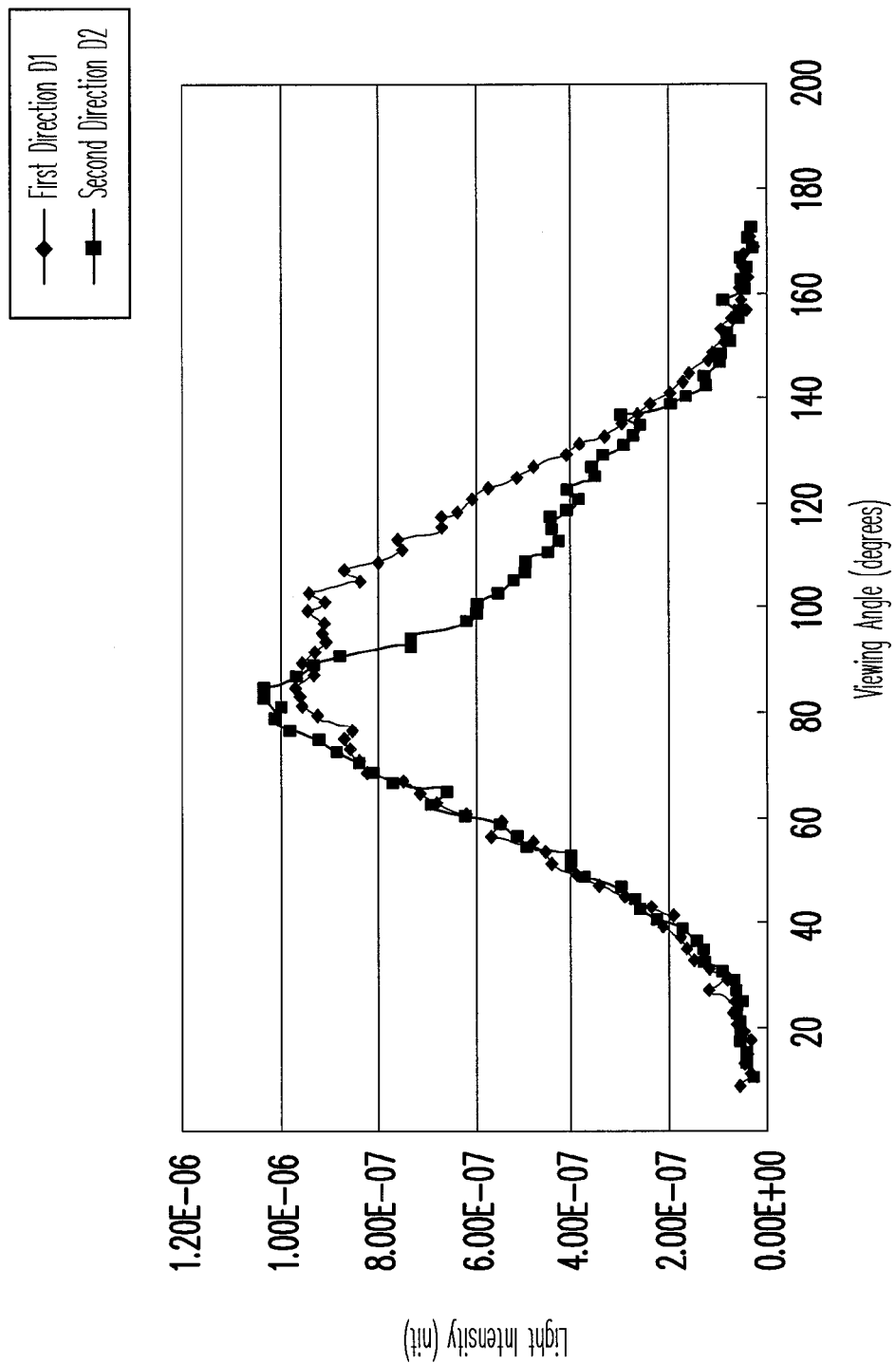
FIG. 2 is an emission distribution diagram of the light source module depicted in FIG. 1A.

Referring to FIG. 2, a first direction D1 is parallel to the direction of the light incident surface 230, and a second direction D2 is perpendicular to the direction of the light incident surface 230. In the embodiment, the second direction D2 is also parallel to a symmetrical plane of the curved grooves 242 in the groove sets 240 passing through the curvature center C, although the invention is not limited thereto. As shown in FIG. 2, a light intensity has a smooth distribution both on the first direction D1 and on the second direction D2. In other words, a drastic variation may not occur with a slowly changing viewing angle along the first direction D1 or the second direction D2. Accordingly, such a light intensity distribution meets the needs of a liquid crystal display.

Figure 3:
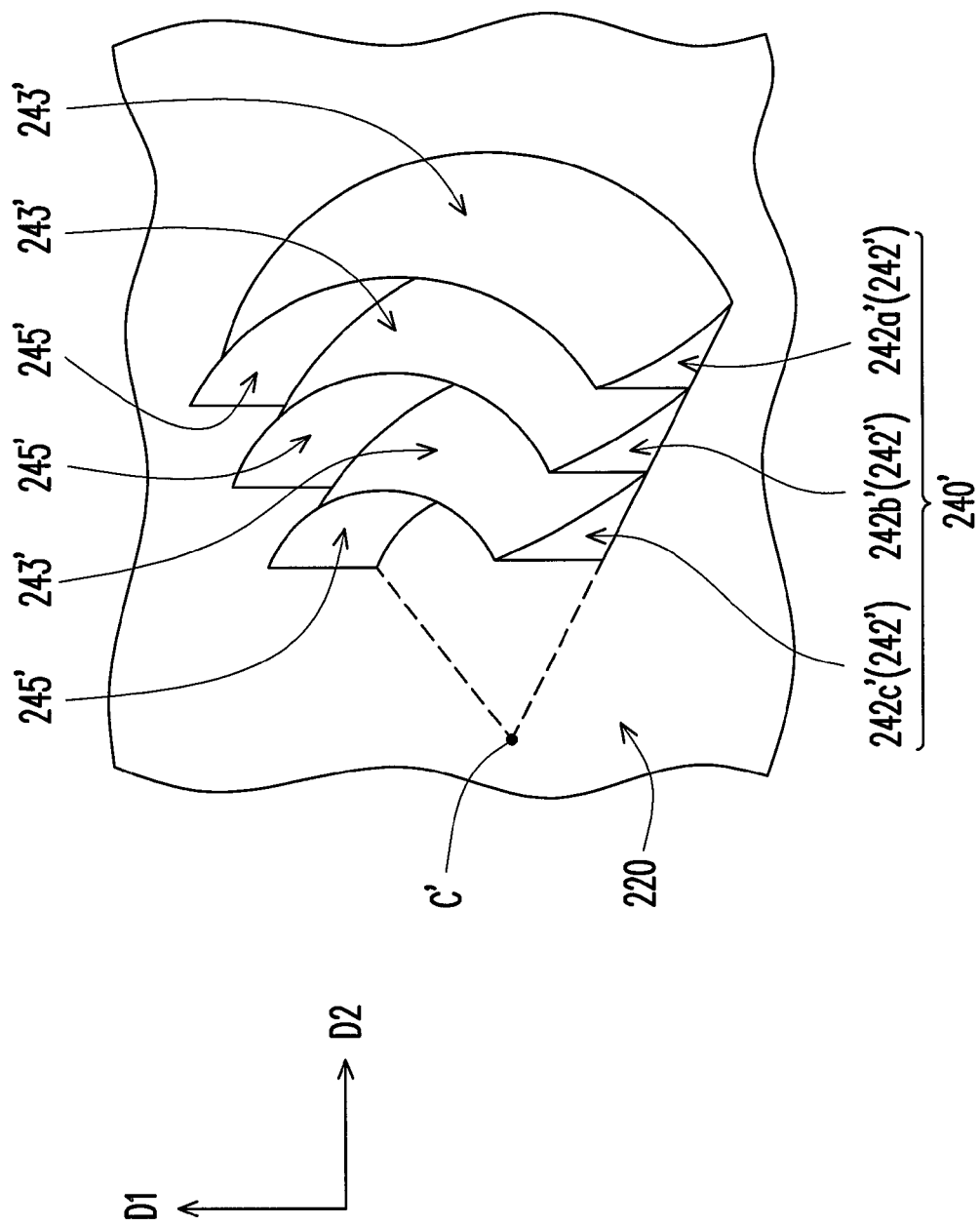
FIG. 3 is an enlarged view of a portion of a second surface of a light source module in accordance with another embodiment of the invention.

Referring to FIGS. 1A, 1C, and 3, a light source module according to the embodiment is similar to the light source module depicted in FIG. 1A, and the differences between the two light source modules are described hereafter. In the light source module according to embodiment shown in FIG. 3, a curved light-back-surface 245' of each of the curved grooves 242' (e.g., curved grooves 242a', 242b', and 242c') of a groove set 240' is disposed between the curved inclined reflective surface 243' of the curved groove 242' and a curvature center C' of the curved groove 242'. By configuring a curving direction of the curved inclined reflective surface 243' as just described, the light source module may also achieve a spreading effect of the light beam 112.

Figure 4A:
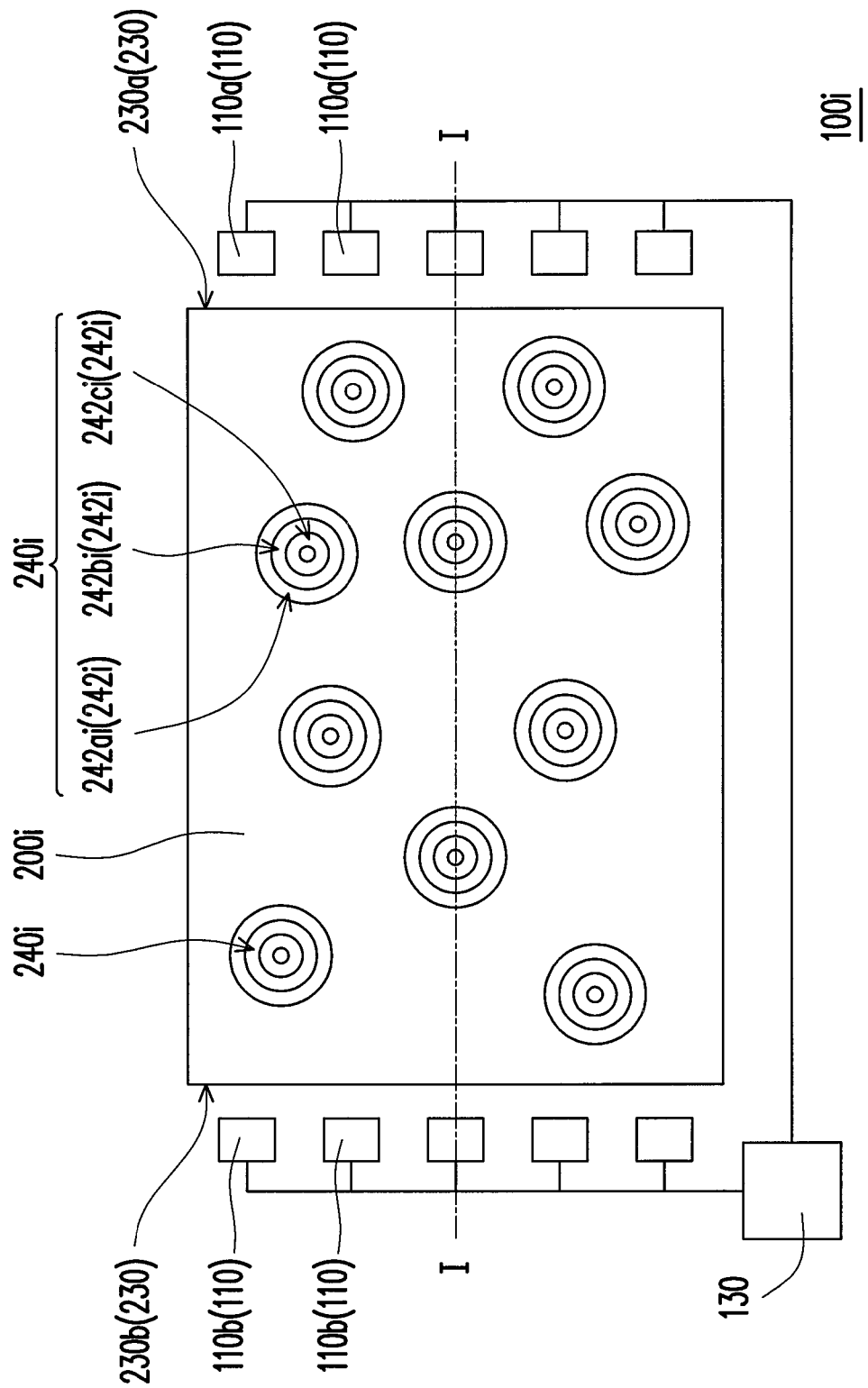
FIG. 4A is a schematic top view of a light source module in accordance with another embodiment of the invention.
Figure 4B:
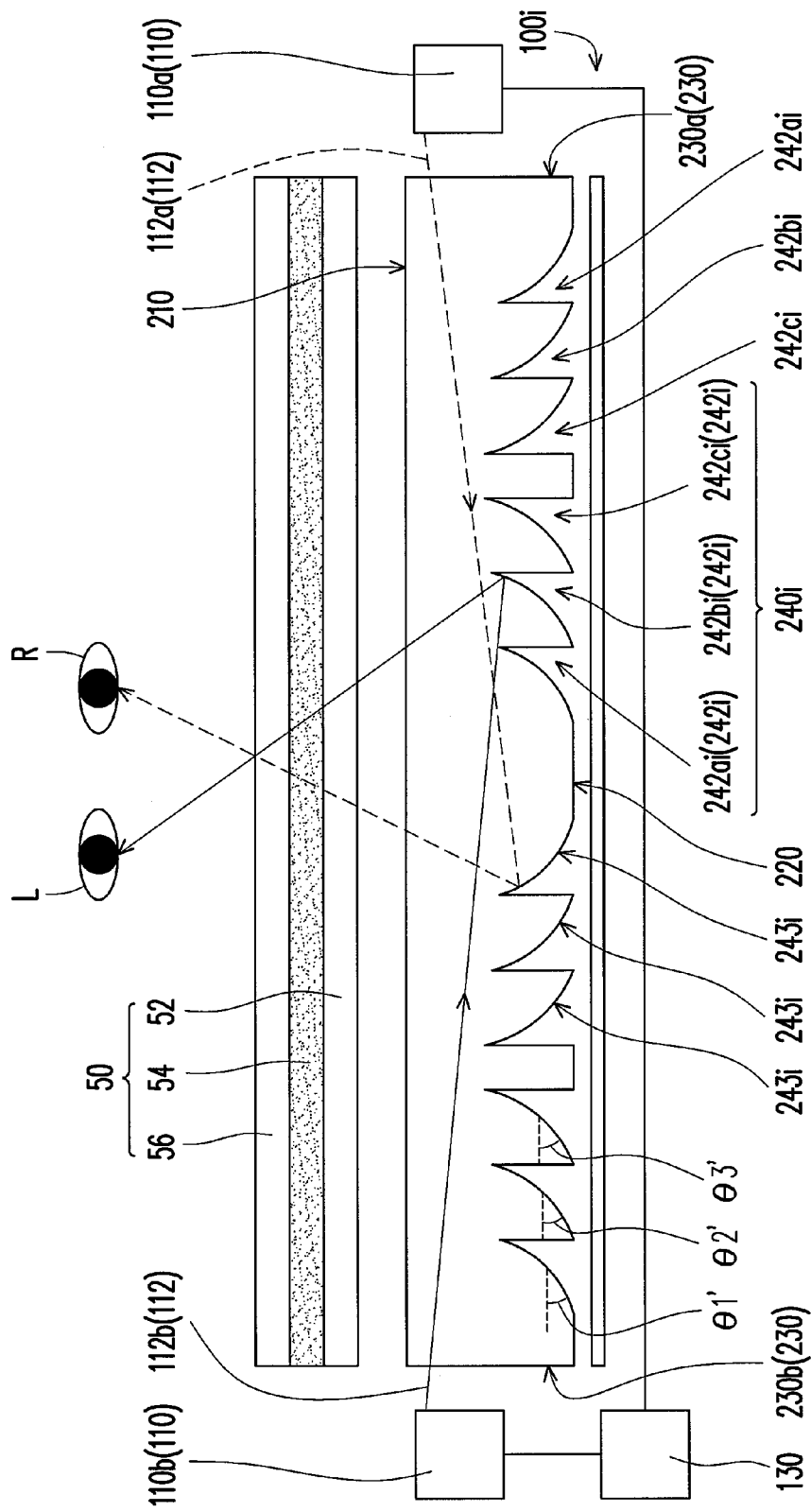
FIG. 4B is a schematic cross-sectional view illustrating a cross section of the light source module depicted in FIG. 4A along a line I-I, and a cross section of a liquid crystal display panel disposed on the light source module.

Referring to FIGS. 4A and 4B, a light source module 100i according to the present embodiment is similar to the light source module 100 depicted in FIG. 1A, and the differences between the light source module 100 and the light source module 100i are described as follows. In the light source module 100i according to the embodiment, each of the curved grooves 242i (e.g., curved grooves 242ai, 242bi, and 242ci) of each of the groove sets 240i is a ring-shaped groove. The ring-shaped grooves 242i may be viewed as the arc-shaped curved grooves 242' depicted in FIG. 3 extended into full circles. In the embodiment, a light guide plate 200i has two opposite light incident surfaces 230 (e.g., light incident surfaces 230a and 230b), and the light emitting device 110 may be divided into a light emitting device 110a and 110b. Moreover, the light emitting devices 110a and 110b are respectively disposed besides the two light incident surfaces 230a and 230b. In the embodiment, the light source module 100i further includes a control unit 130 electrically connected to the light emitting devices 110a and 110b, for driving the light emitting devices 110a and 110b to turn on alternately. In other words, when the light emitting device 110a emits a light beam 112a, the light emitting device 110b may not emit a light beam 112b. Additionally, when the light emitting device 110b emits the light beam 112b, the light emitting device 110a may not emit the light beam 112a.

In the embodiment, an average inclination angle of each of the curved inclined reflective surfaces 243i is larger than or equal to 40° and is smaller than or equal to 60°. For example, the average inclination angles θ1', θ2', and θ3' of the curved inclined reflective surfaces 243i of the curved grooves 242ai, 242bi, and 242ci may be unequal to each other, although the invention is not limited thereto. According to the embodiment, a liquid crystal panel 50 may be disposed above the light source module 100i, so as to form a three-dimensional display. In the embodiment, the liquid crystal panel 50 includes an active device array substrate 52, a liquid crystal layer 54, and an opposite substrate 56, sequentially arranged from bottom to top. Moreover, the active device array substrate 52 is a thin film transistor array substrate, and the opposite substrate 56 is a color filter array substrate, for example. The above-described design of average inclination angles may cause the light beam 112b emitted by the light emitting device 110b to be reflected by the curved inclined reflective surfaces 243i towards an upper-left direction of FIG. 4B. The light beam 112b is transmitted to a left eye L of a user after carrying an image of the liquid crystal panel 50. Moreover, the light beam 112a emitted by the light emitting device 110a is reflected by the curved inclined reflective surfaces 243i towards an upper-right direction of FIG. 4B. The light beam 112a is transmitted to a right eye R of the user after carrying an image of the liquid crystal panel 50. By using the light beams 112a and 112b to alternately carry a left eye image and a right eye image, a stereoscopic image may be generated in the user's brain.

Figure 5:
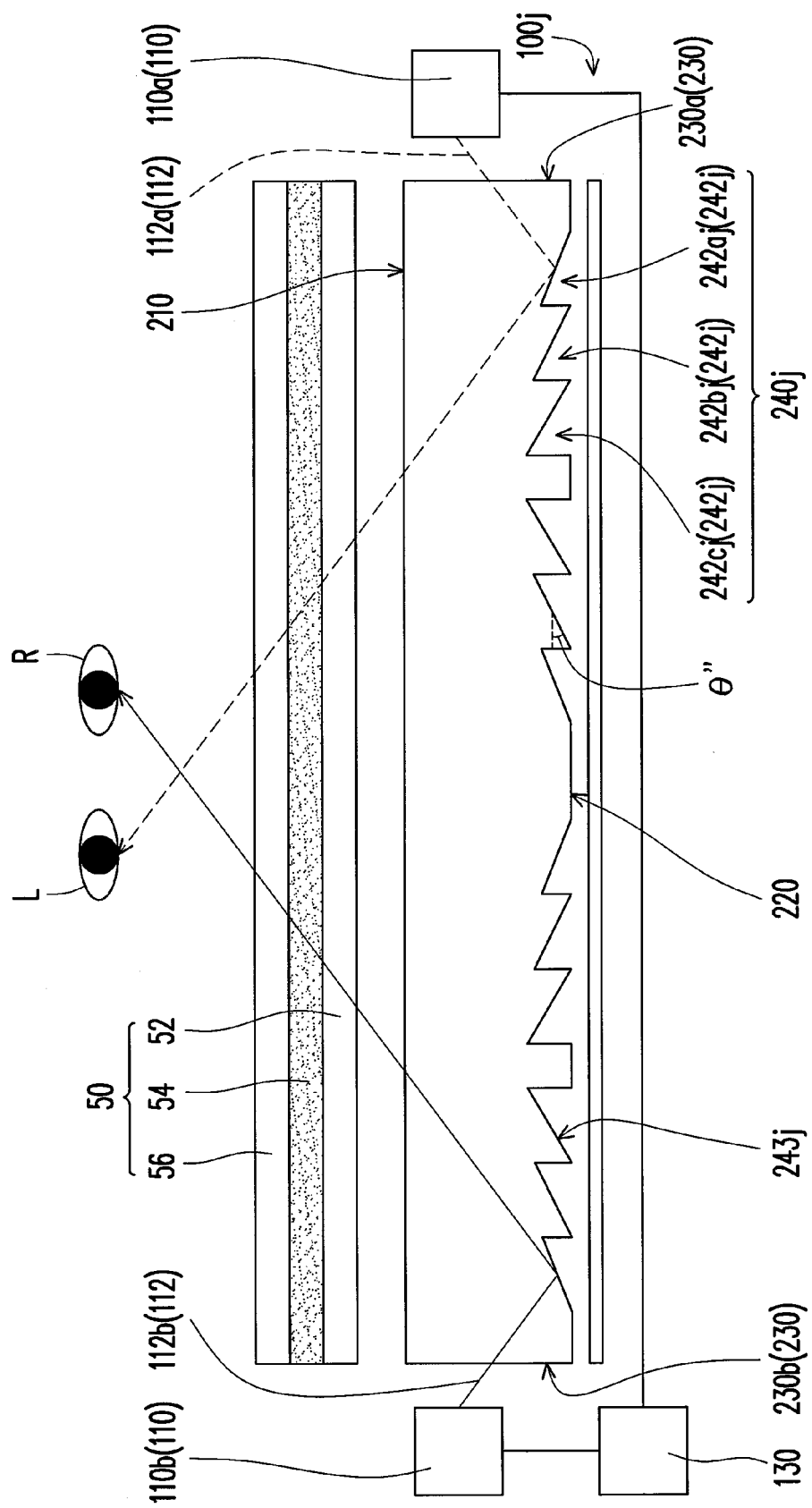
FIG. 5 is a schematic cross-sectional view illustrating a cross section of a light source module and a cross section of a liquid crystal display panel disposed on the light source module in accordance with another embodiment of the invention.

Referring to FIG. 5, a light source module 100j according to the present embodiment is similar to the light source module 100i depicted in FIG. 4B, and a main difference between the light source module 100i and the light source module 100j is in a setting of the average inclination angles of the curved inclined reflective surfaces. In the light source module 100j according to the embodiment, an average inclination angle θ" of a curved inclined reflective surface 243j of each of the curved grooves 242j (e.g., curved grooves 242aj, 242bj, and 242cj) of each of the groove sets 240j is larger than or equal to 30° and is smaller than or equal to 50°. By setting the average inclination angles as described above, the light beam 112b emitted by the light emitting device 110b may be reflected by the curved inclined reflective surfaces 243j towards an upper-right direction of FIG. 5. The light beam 112b is transmitted to the right eye R of the user after carrying an image of the liquid crystal panel 50. Moreover, the light beam 112a emitted by the light emitting device 110a is reflected by the curved inclined reflective surfaces 243j towards an upper-left direction of FIG. 5. The light beam 112a is transmitted to the left eye L of the user after carrying an image of the liquid crystal panel 50. By using the light beams 112a and 112b to alternately carry a left eye image and a right eye image, a stereoscopic image may be generated in the user's brain. In the embodiment, a cross-sectional outline of the curved inclined reflective surface 243j sliced along a direction perpendicular to the first surface 210 has a straight linear shape. However, in other embodiments, the cross-sectional outline may also have a curved line shape.

Figure 6:
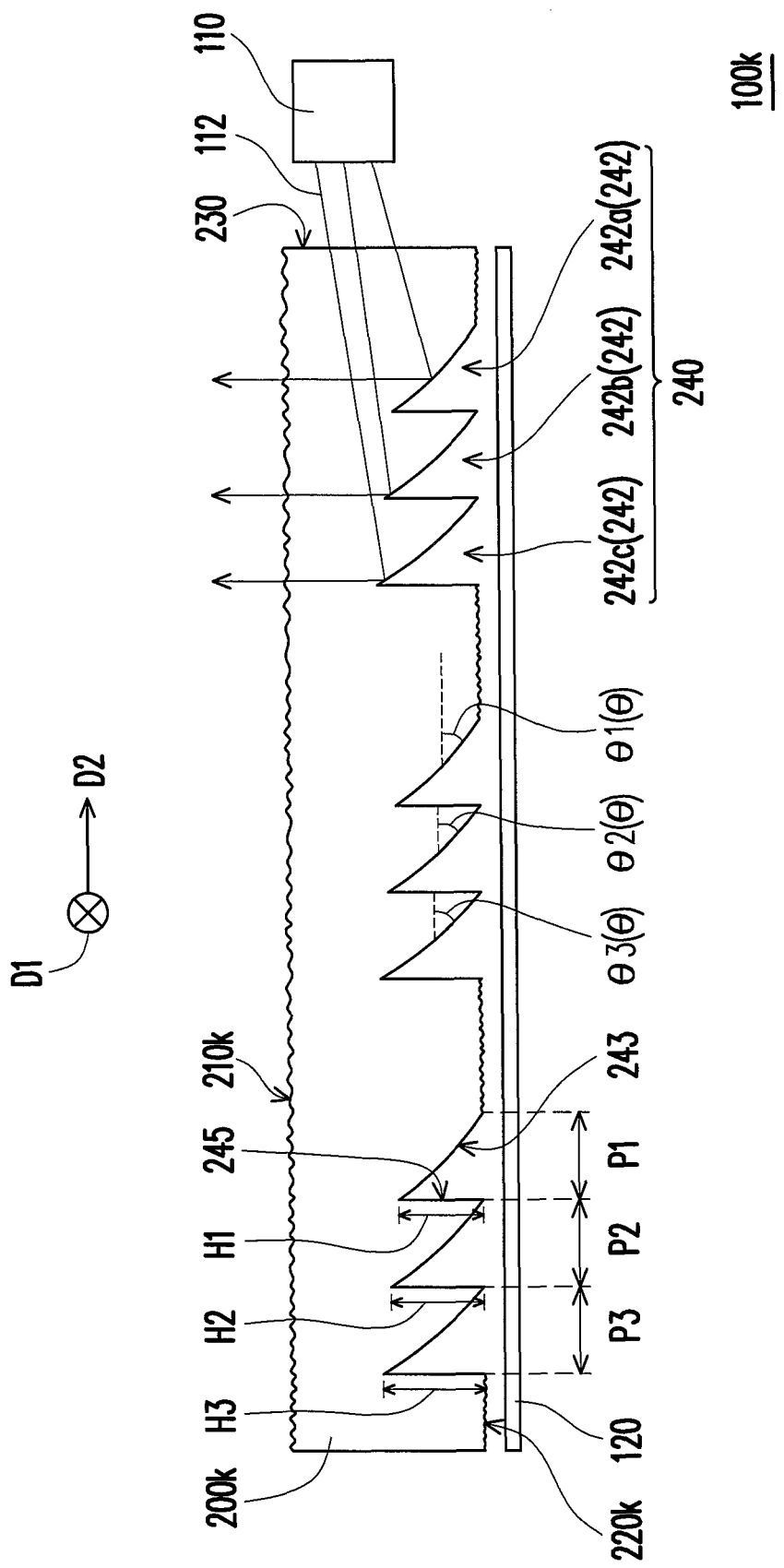
FIG. 6 is a schematic cross-sectional view of a light source module in accordance with another embodiment of the invention.

Referring to FIG. 6, a light source module 100k according to this embodiment is similar to the light source module 100 in FIG. 1A, and the difference therebetween lies in the light guide plate. A light guide plate 200k of the light source module 100k of this embodiment is similar to the light guide plate 200 in FIG. 1A except that the first surface 210 and the second surface 220 other than the groove sets 240 in FIG. 1A are plane surfaces, but a first surface 210k and the second surface 220k other than the groove sets 240 of the light guide plate 200k in this embodiment are sandblasted surfaces. The sandblasted surfaces blur independent bright spots caused by the groove sets 240 or defects of the light guide plate 200k, so that a user is hard to observe or does not observe independent bright spots. As a result, the brightness of the light source module 100k is more uniform. In other embodiments, the first surface 210k may be a sandblasted surface, but the second surface 220k other than the groove sets 240 may be a plane surface. Alternatively, the first surface 210k may be a plane surface, but the second surface 220k other than the groove sets 240 may be a sandblasted surface.

In light of the foregoing, the embodiments of the invention may have at least one of the following advantages. In the light guide plate and the light source module according to embodiments of the invention, curved inclined reflective surfaces are disposed on the second surface, and the curved inclined reflective surfaces may reflect a light beam towards a predetermined direction. Therefore, the amount of optical films employed above the first surface of the light guide plate may be reduced, or the use of optical films may be completely avoided, thereby lowering a light loss and reducing costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light guide plate, comprising:
a first surface;
a second surface opposite to the first surface;
at least a light incident surface connected with the first surface and the second surface; and
a plurality of groove sets separately disposed on the second surface, wherein each of the groove sets comprises a plurality of curved grooves, each of the curved grooves having a curved inclined reflective surface and a curved light-back-surface connected to each other, the curved inclined reflective surface inclined with respect to the first surface, the curved grooves of each of the groove sets curving towards a same curving direction, and the curved inclined reflective surface of one of two adjacent curved grooves is connected to the curved light-back-surface of the other one of the two adjacent curved grooves, and orthographic projections of the curved grooves on the first surface are arc-shaped.

2. The light guide plate as claimed in claim 1, wherein average inclination angles of the curved inclined reflective surfaces of the curved grooves of each of the groove sets with respect to the first surface are substantially different from each other.

3. The light guide plate as claimed in claim 2, wherein the average inclination angles of the curved inclined reflective surface of the curved grooves in each of the groove sets with respect to the first surface are ordered from large to small in sequence, and a difference value between any two average inclination angles, close to each other in magnitude, of the curved inclined reflective surface of the curved grooves of each of the groove sets with respect to the first surface is less than or equal to 10°.

4. The light guide plate as claimed in claim 1, wherein an average inclination angle of each of the curved inclined reflective surfaces ranges from 30° to 60°.

5. The light guide plate as claimed in claim 1, wherein each of the curved grooves is an arc groove, and the curved inclined reflective surface of the arc groove is disposed between the curved light-back-surface and the light incident surface.

6. The light guide plate as claimed in claim 1, wherein each of the curved grooves is a ring-shaped groove.

7. The light guide plate as claimed in claim 1, wherein the curved inclined reflective surface of the curved groove is disposed between the curved light-back-surface and a curvature center of the curved groove.

8. The light guide plate as claimed in claim 1, wherein the curved light-back-surface of the curved groove is disposed between the curved inclined reflective surface and a curvature center of the curved groove.

9. The light guide plate as claimed in claim 1, wherein at least one of the first surface and the second surface other than the groove sets is a sandblasted surface.

10. A light source module, comprising:
a light guide plate, comprising:
a first surface;
a second surface opposite to the first surface;
at least a light incident surface connected with the first surface and the second surface; and
a plurality of groove sets separately disposed on the second surface, wherein each of the groove sets comprises a plurality of curved grooves, each of the curved grooves having a curved inclined reflective surface and a curved light-back-surface connected to each other, the curved inclined reflective surface inclined with respect to the first surface, the curved grooves of each of the groove sets curving towards a same curving direction, and the curved inclined reflective surface of one of two adjacent curved grooves is connected to the curved light-back-surface of the other one of the two adjacent curved grooves, and orthographic projections of the curved grooves on the first surface are arc-shaped; and
at least a light emitting device disposed besides the light incident surface and capable of emitting a light beam, wherein the light beam is capable of entering the light guide plate through the light incident surface and transmitting out of the light guide plate through the first surface, and the curved inclined reflective surface is capable of reflecting the light beam from the light incident surface to the first surface.

11. The light source module as claimed in claim 10, wherein average inclination angles of the curved inclined reflective surfaces of the curved grooves of each of the groove sets with respect to the first surface are substantially different from each other.

12. The light source module as claimed in claim 11, wherein a smallest difference value between the average inclination angles of the curved inclined reflective surfaces of the curved grooves of each of the groove sets with respect to the first surface is less than or equal to 10°.

13. The light source module as claimed in claim 10, wherein an average inclination angle of each of the curved inclined reflective surfaces ranges from 30° to 60°.

14. The light source module as claimed in claim 10, wherein each of the curved grooves is an arc groove, and the curved inclined reflective surface of the arc groove is disposed between the curved light-back-surface and the light incident surface.

15. The light source module as claimed in claim 10, wherein each of the curved grooves is a ring-shaped groove.

16. The light source module as claimed in claim 15, wherein the at least a light incident surface are two opposite light incident surfaces, the at least a light emitting device are two light emitting devices respectively disposed besides the two light incident surfaces, the light source module further comprising a control unit electrically connected to the two light emitting devices, for driving the two light emitting devices to turn on alternately.

17. The light source module as claimed in claim 16, wherein the average inclination angle of each of the curved inclined reflective surfaces ranges from 30° to 50°.

18. The light source module as claimed in claim 16, wherein the average inclination angle of each of the curved inclined reflective surfaces ranges from 40° to 60°.

19. The light source module as claimed in claim 10, wherein the curved inclined reflective surface of the curved grooves is disposed between the curved light-back-surface and a curvature center of the curved groove.

20. The light source module as claimed in claim 10, wherein the curved light-back-surface of the curved grooves is disposed between the curved inclined reflective surface and a curvature center of the curved groove.

21. The light source module as claimed in claim 10, further comprising a reflective unit disposed on the second surface.

22. The light source module as claimed in claim 10, wherein at least one of the first surface and the second surface other than the groove sets is a sandblasted surface.

* * * * *